United States Patent [19]

Balinth

[11] 3,925,271
[45] Dec. 9, 1975

[54] PRESSURE SENSITIVE ADHESIVE COMPOSITION

[75] Inventor: Ivan J. Balinth, Cranford, N.J.

[73] Assignee: Johnson & Johnson, New Brunswick, N.J.

[22] Filed: Aug. 8, 1974

[21] Appl. No.: 495,706

Related U.S. Application Data

[63] Continuation-in-part of Ser. No. 238,945, March 28, 1972, abandoned.

[52] U.S. Cl. ............ 260/3; 117/122 P; 117/122 PA; 260/23.7 R; 260/33.6 AQ; 260/42.47; 260/752; 260/761; 260/765
[51] Int. Cl.² . A61L 15/06; C08K 3/36; C08K 5/01; C08L 7/00
[58] Field of Search ................ 117/122 P, 122 PA; 260/42.37, 765, 3, 42.47, 23.7 R, 33.6 AQ, 752, 761

[56] References Cited
UNITED STATES PATENTS

| | | | |
|---|---|---|---|
| 2,909,278 | 10/1959 | Blackford | 206/59 C |
| 3,378,630 | 4/1968 | Mendelsohn et al. | 117/122 PA |

*Primary Examiner*—Donald E. Czaja
*Assistant Examiner*—H. H. Fletcher

[57] ABSTRACT

An uncured pressure sensitive adhesive composition wherein the adhesive comprises a rubber elastomer; a tackifier; and at least 14% by weight of a finely divided particulate silica. This adhesive when incorporated on a backing material is particularly useful for sealing the backing material to metal surfaces, especially those which are to be subjected to elevated temperatures, such for example, as tape used to join and seal ventilation duct sections in forced-air heating systems. It also is possible to coat this adhesive effectively by calendering or extrusion.

10 Claims, No Drawings

PRESSURE SENSITIVE ADHESIVE COMPOSITION

This application is a continuation-in-part of my co-pending application Ser. No. 238,945, filed Mar. 28, 1972, and now abandoned.

This invention relates to pressure sensitive adhesive compositions. More particularly, it relates to rubber based pressure sensitive adhesive compositions suitable for incorporation onto one or more surfaces of a backing material to thereby impart pressure sensitive adhesive qualities to the material.

Pressure sensitive adhesive compositions have been heretofore utilized in the packaging, electrical insulation and construction fields. For example, the flaps of corrugated paper cartons can be coated with pressure sensitive adhesive and then temporarily protected against premature sealing with peelable releasable paper until closure is desired.

Pressure sensitive adhesives are also utilized to coat a flexible backing material to impart pressure sensitive adhesive qualities to the material. Flexible backing materials that have been employed include paper, cloth and synthetic plastics as well as combinations of these, such as polyethylene coated fabric or aluminized plastic film.

Pressure sensitive adhesive coated materials are most conveniently wound upon themselves about a cylindrical core forming a tape which can be unwound and detached in suitable lengths for use.

Uses for such tapes include the joining and sealing together of sections of metal ventilating ducts, and the electrical insulation of fractional horsepower electrical motors. In both these applications moderately high temperatures are encountered which result in the presently formulated adhesives losing holding power.

Efforts to increase the holding power of adhesives at elevated temperatures have included changing ratio and identity of elastomer and tackifier, but without much success.

These efforts have been concentrated upon improving the individual components of the adhesive composition, especially the tackifier and elastomer which contribute directly to adhesive properties. Any improvements, however, have been slight.

Another approach has been to partially cure the adhesive so that its flow properties at elevated temperatures are reduced, but the adhesive must retain sufficient flow properties to maintain its pressure-sensitive tack. This is an expensive alternative since it requires special formulations and expensive equipment to partially cure the adhesive. This approach likewise is not generally suitable for calendar or extrusion coating since the adhesive would tend to cure before application and would not flow onto the backing properly.

Therefore, it is the primary object of this invention to provide an adhesive composition which retains tack and holding power at moderately high temperatures, particularly when in contact with metal surfaces.

Needless to say, it is a further object of this invention to provide such an adhesive which possesses these properties in an uncured state and therefore can be applied as an uncured adhesive composition by the calendering or the extrusion process. This and other objects are met by providing a pressure sensitive adhesive composition comprising at least about 14% by weight of a particulate silica. Generally the silica should be of a sufficiently small particle size to provide a surface area of at least 130 meters $^2$/gram. Particles having an ultimate particle size of less than 0.03 microns are desirable, while those having an ultimate particle size in the range of 0.020 to 0.030 microns are preferred.

As used herein, the term silica is meant to describe a material having a composition which comprises $SiO_2$ as the major component, usually greater than 80%. It is recognized in the art that silica, however obtained, whether from fumed silica, precipitated silica or natural mined silica will contain various amounts of other metal oxides such as magnesium oxide, together with some water of crystallization, varying amounts of which can be driven off upon ignition. The presence of these impurities does not alter the properties imparted to the adhesive composition in any observable way, yet to insure uniformity of product, the commercially available silica Hi-Sil 233 manufactured by PPG, Pittsburgh, Pennsylvania, is preferred.

In pressure sensitive adhesive compositions heretofore known, particularly those employed as the adhesive mass of pressure sensitive tape wherein the composition included a rubber elastomer and a tackifier, small amounts of silica were at times included to improve the aging characteristics of the tape, as is disclosed in U.S. Pat. No. 2,909,278. Tapes having an adhesive mass that included the 10% or less silica as taught in the above patent, did not exhibit sustained holding power at elevated temperatures, especially when natural raw rubber was employed as the elastomer.

It should be noted that when the quantity of particulate silica is greater than 19% by weight and approaches 24%, the adhesive mass upon aging tends to become brittle. Therefore, although the holding power has been found to increase with increasing quantities of particulate silica the desirable range for a commercially suitable adhesive is from about 14 to 19% silica.

When applying the adhesive mass to a backing material, it can be applied from either a solvent system, calendered onto the backing material, or applied as a hot melt and permitted to cool as a thin layer upon the flexible backing material. When applied from a solvent, suitable solvents and suspending agents for the adhesive mass are petroleum distillates including hexane and toluene. When applied as a hot melt, the mass is best applied to the backing material at a temperature of about 120°C.

In general, the pressure sensitive adhesives of this invention comprise an elastomer, a tackifier and the particulate silica. Suitable elastomers include natural or reclaimed rubber and/or virgin or reclaimed synthetic rubber. Examples of such synthetic rubbers are styrene-butadiene rubber, nitrile rubber, butyl rubber, chloroprene rubber, isoprene rubber and isobutylene rubber. Natural rubber especially raw natural rubber is however preferred.

Suitable tackifiers include those disclosed in U.S. Pat. Nos. 2,484,060 and 2,615,059. Preferred tackifiers are the polyterpene resins comprising α-pinene, and β-pinene as a main ingredient. These are available with softening points of 75° to 135°C, but polyterpene resins having a softening point of 95°C are found particularly suitable. Other preferred tackifiers are hydrocarbon resins comprising piperylene structures, or piperylene and/or isoprene structures, polymerized from a stream of aliphatic petroleum derivatives in the form of dienes and mono-olefins having 5 or 6 carbon atoms generally in accordance with the teachings of U.S. Pat. No. 3,577,398. Preferably the dienes are piperylene or a mixture of piperylene and/or isoprene. A preferred tackifier of this type is Wingtack 95 offered by Goodyear Chemical Company. This resin has a softening point of 95°C. However, similar resins may be produced with different softening points.

If desired, a plasticizer such as lanolin, low molecular weight polyisobutylene ( <2000 mol. wt. ) and naphthenic petroleum oils can be included in the adhesive composition. In order to obtain good shelf life an antioxidant stabilizer such as zinc dibutyl dithiocarbamate (butyl zimate) can be used. Various fillers such as finely divided clays, calcium carbonate or other inert material can also be included in the adhesive formulation if desired. For example, as an opacifying agent and a filler, finely divided titanium dioxide is particularly suitable.

The adhesives of this invention contain these ingredients in amounts varying from about 14–60% elastomer, 21–50% tackifier, 0–15% plasticizer, 0.25–4% stabilizer, 0–40% filler, all percentages being percent by weight; and being exclusive of the silica, which is included in an amount of about at least 14% by weight.

The preferred adhesive composition and an illustration of how it is used is set forth below in Example I. In that and the following examples it should be clearly realized that these examples are included for purposes of illustration and clarification and not as limitations.

EXAMPLE I

| Ingredient | Formulation % By Weight |
| --- | --- |
| Natural Rubber | 37.56 |
| Particulate Silica (Hi-Sil 233) | 15.03 |
| Opacifier (Titanium Dioxide) | 3.15 |
| Tackifier (Wing Tack 95°C Softening Point) | 43.84 |
| Antioxidant (Butyl Zimate) | .42 |
| | 100.00 |

Sufficient material to produce 100 lbs. of adhesive composition is prepared by blending all the ingredients except 25% of the tackifier in a Banbury mixer. Blending is then completed with the addition of the remaining tackifier on a conventional rubber mill. The mass is then calendered at a uniform thickness of 4½ oz. of mass/sq. yd. (an adhesive layer of about 0.0045" thick) on a polyethylene coated cotton fabric of thread count 44×36 having a weight of 1½ oz./sq. yd. of fabric.

The adhesive coated fabric is then cut and wound in 60 yd. lengths at a controlled tension onto 3 inch diameter paper cores and then slit into 2 inch widths. The hold power of such tape when applied to chrome plated steel is illustrated in the table below.

| | R.T.(1 Wk.) 1st Run | R.T.(1 Wk.) 2nd Run | 100°F.(2 Wks.) 1st Run | 100°F.(2 Wks.) 2nd Run | 120°F.(2 Wks.) 1st Run | 120°F.(2 Wks.) 2nd Run |
| --- | --- | --- | --- | --- | --- | --- |
| Adh. to Steel (oz./in.) | 36 | 32 | 34 | 29 | 32 | 27 |
| Tack | 4.3 | 8.4 | 3.1 | 15.5 | 3.8 | 18.4 |
| 20° Hold (min.) | 120 | 223 | — | — | — | — |
| Unwind (oz./in.) | 35 | 30 | 43 | 54 | 52 | 59 |

Adhesion to steel is measured by peeling the tape backing over itself 180° at a constant speed (by a force applied to the free end of the tape) from a smooth steel surface to which it has been applied by a fixed pressure. For the techniques used in conducting this test, see the 180° peel adhesion test PSTC-1 of the Pressure-sensitive Tape Council.

Tack or quick stick is measured by laying a length of tape, adhesive side up, upon a horizontal surface and then rolling a hollow plastic ball down an incline onto the adhesive. The vertical height at which the ball starts and the distance the ball rolls along the tape before coming to rest is measured. Quick stick is reported as the height in inches raised to the three-halves power, divided by the distance rolled in inches. This ratio is found to be a constant for a given tape. The ball is plastic and approximately 1.5 inches in diameter, and weighs approximately 2 grams. Its outer surface is carefully cleaned between each test.

Twenty degrees (20°) hold is measured in terms of the time taken to strip a specified tape sample from a one-half (½) inch by one-half (½) inch chrome-plated surface by attaching a 400 gram weight to the bottom end of the tape when the surface is disposed at 20° to the vertical and the tape is hanging at an angle of 20° to the adjacent portion of the chrome-plated surface from which it is being removed.

"Unwind" is determined by measuring the force in ounces per inch of width required to unwind the tape or sheet at 75 feet per minute while drawing the end thereof radially away from a roll of the tape or sheet wound upon itself and mounted on a free-turning mandrel.

EXAMPLE II

| Ingredient | Formulation % By Weight |
| --- | --- |
| Natural Rubber | 36.00 |
| Particulate Silica (Hi-Sil 233) | 19.12 |
| Opacifier (Titanium Dioxide) | 3.15 |
| Tackifier Coumarone - Indene Resin (95°C Softening Point) | 41.31 |
| Antioxidant (Butyl Zimate) | .42 |
| | 100.00 |

This composition is milled in the same manner as the composition of Example 1 and then calendered onto a paper which has been saturated with a solvent based rubber solution, and the back side has been coated with polypropylene. After the calendering operation is completed the paper is wound upon itself, about a core and then slit into convenient widths.

EXAMPLE III

A tape is prepared in the same manner as described in Example I, except the formulation is as follows:

| Ingredient | % BY Weight |
| --- | --- |
| Butadiene - Styrene | 38.03 |
| Particulate Silica (Hi-Sil 233) | 14.00 |
| Opacifier (TiO₂) | 3.50 |
| Tackifier Polyterpene (115°C Melting Point) | 44.05 |
| Antioxidant (Butyl Zimate) | .42 |
| | 100.00 |

What is claimed is:

1. A pressure-sensitive adhesive composition consisting essentially of about 14–60% of uncured or reclaimed elastomers selected from the group consisting of natural rubber, styrene-butadiene rubber, nitrile rubber, butyl rubber, chloroprene rubber, isoprene rubber and isobutylene rubber; 21–50% tackifier; 0–15% plasticizer; 0.25–4% stabilizer; 14–19% of particulate silica having a surface area of at least 130 meters $^2$/gram; and 0–40% of fillers other than silica; all percentages being by weight.

2. A composition according to claim 1 in which said elastomer is a natural rubber.

3. A composition according to claim 2 in which said rubber is raw natural rubber.

4. A composition according to claim 1 in which said tackifier is a polyterpene resin.

5. A composition according to claim 1 in which said filler is the opacifying agent, titanium dioxide.

6. A heat resistant pressure sensitive adhesive structure comprising a flexible backing material carrying upon at least one surface thereof an adhesive composition consisting essentially of about 14–60% of uncured or reclaimed elastomers selected from the group consisting of natural rubber, styrene-butadiene rubber, nitrile rubber, butyl rubber, chloroprene rubber, isoprene rubber and isobutylene rubber; 21–50% tackifier; 0–15% plasticizer; 0.25–4% stabilizer; 14–19% of particulate silica having a surface area of at least 130 meters $^2$/gram; and 0–40% of fillers other than silica; all percentages being by weight.

7. A pressure sensitive adhesive structure according to claim 6 in which said elastomer is a natural rubber.

8. A pressure sensitive adhesive structure according to claim 7 in which said rubber is raw natural rubber.

9. A pressure sensitive adhesive structure according to claim 6 in which said tackifier is a polyterpene resin.

10. A pressure sensitive adhesive structure according to claim 6 in which said filler is the opacifying agent, titanium dioxide.

* * * * *